United States Patent [19]

Hoffman et al.

[11] Patent Number: 5,134,812
[45] Date of Patent: Aug. 4, 1992

[54] MECHANICAL CONNECTOR FOR STRUCTURAL MEMBERS

[75] Inventors: Kenneth E. Hoffman; Gerald D. Embry, both of Gautier, both of Miss.

[73] Assignee: Ingalls Shipbuilding, Inc., Pascagoula, Miss.

[21] Appl. No.: 504,001

[22] Filed: Apr. 4, 1990

[51] Int. Cl.⁵ .............................. E04B 1/38
[52] U.S. Cl. ........................... 52/1; 52/710; 403/305; 403/404
[58] Field of Search ............... 52/1, 573, 35, 397, 52/398, 403, 400, 710; 403/404, 391, 300, 305

[56] References Cited

U.S. PATENT DOCUMENTS

| | | | |
|---|---|---|---|
| 2,835,360 | 5/1958 | Bernardoni et al. | 52/403 |
| 3,032,603 | 5/1962 | Whitley | 403/391 |
| 3,121,261 | 2/1964 | Ritter, Jr. | 52/399 |
| 4,034,531 | 7/1977 | Balinski | 52/484 |
| 4,991,991 | 2/1991 | Ito et al. | 403/30 |

Primary Examiner—Michael Safavi
Attorney, Agent, or Firm—D. J. Ellingsberg

[57] ABSTRACT

The invention is a connector to join structural members. In particular, the invention is a connector to assemble and join structural members where the members can be formed from dissimilar materials; for example, an aluminum plate joined by the connector to a steel plate. The connector can be formed in part or in whole from a shape memory metal that exhibits dimensional change upon assembly to complete the joint.

13 Claims, 3 Drawing Sheets

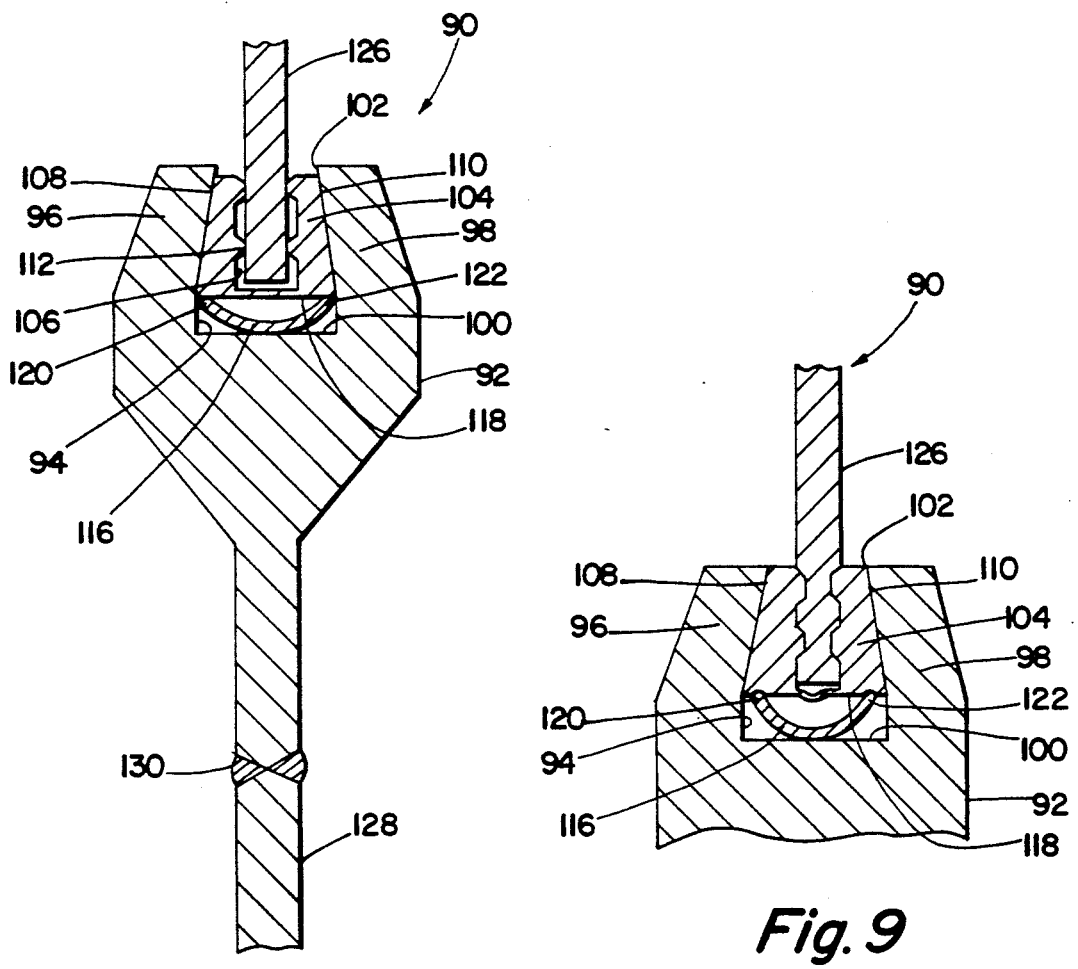
Fig. 8
Fig. 9
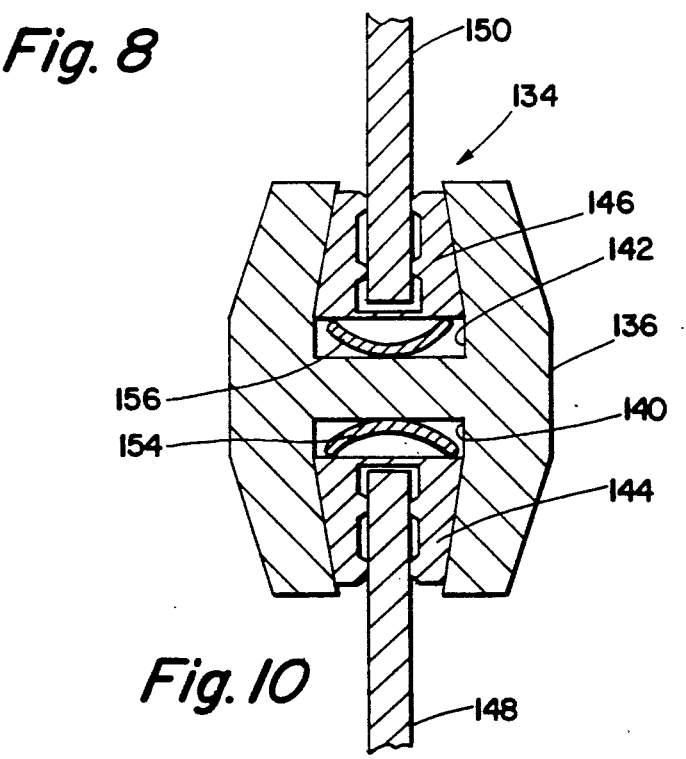
Fig. 10

MECHANICAL CONNECTOR FOR STRUCTURAL MEMBERS

BACKGROUND OF THE INVENTION

1. Field of the Invention

There are several methods presently used to join structural members, particularly those members that are plates formed of dissimilar metals; for example, plates used in the construction of ships. The use of thin plate and the extensive inclusion of aluminum inserts in steel structure on the new ships being designed today has presented a difficult and labor intensive condition for the Naval architects and the construction trades.

2. Description of the Known Related Art

Current methods to join plates include: to weld causing the material of the plates to fuse together, or to bond using adhesives which attach via properties of the bonding agent(s), or to mechanically fasten by the use of physical force. For example, one current method of welding joins dissimilar metals, such as aluminum structure to steel structure, by an explosion bonded piece of "Deta Couple" which is aluminum on one side and steel on the other. Another mechanical method can be an externally applied deformation or penetration of the plates through the use of bolts, rivets, or clamps. Each of these methods has its limitations and disadvantages:

1. Welding requires that the materials of two or more plates to be joined be compatible metallurgically or molecularly to the fusion process. The heat generated by welding, or by brazing, may result in degradation of some material properties.
2. Adhesive bonding requires that the material of the plate and the bonding agent be chemically compatible and environmentally controlled for proper curing.
3. Mechanical fasteners are both labor and material intensive, and require specialized equipment and training. Mechanical fastening does not produce an optimum structural connection, particularly in the construction of ships.

Further, current methods to join structural members formed of dissimilar metals have the continuing requirement either to inhibit or, preferably, eliminate galvanic action developed by and between the dissimilar metals.

SUMMARY OF THE INVENTION

Briefly, in accordance with the invention, a compressive connector assembly for fastening or joining structural members includes an element formed from a PRIOR ART material that has a shape memory which undergoes a transformation both in crystal structure and thereby in critical dimensions when the material is exposed to selected high temperature excursions and to low temperature gradients which develops a compressive force acting upon a channel member in the assembly where the channel in the member has opposing walls spaced-apart by a distance D1 subsequent to a high temperature excursion and by a distance D2 at the low temperature gradients where D1<D2 so that a structural member having a thickness T1 positioned partially within the compressive channel prior to the high temperature excursion is clamped or retained by the channel member when D1<T1<D2.

Accordingly, one object of the invention is to join structural members by compressive force.

Another object of the invention is to join structural members formed from dissimilar materials by compressive force without direct contact of the structural members with each other.

Another object of the invention is to join structural members by compressive force with a universal connector.

Another object of the invention is to join structural members by compressive force with a resulting joint formed by other than fusion welding or mechanical fasteners.

Further objects, features and the attending advantages of the invention will be apparent when the following description is read with the accompanying drawings.

BRIEF DESCRIPTION OF THE DRAWINGS

FIG. 8 is an end view, in cross section, of another form of connector of the invention in an assembly of structural members.

FIG. 9 is an end view, partly broken away, of the connector of FIG. 8.

FIG. 10 is an end view, partly in cross section, of yet another form of connector of the invention in an assembly of structural members.

DESCRIPTION OF THE PREFERRED EMBODIMENTS

Figure 1:
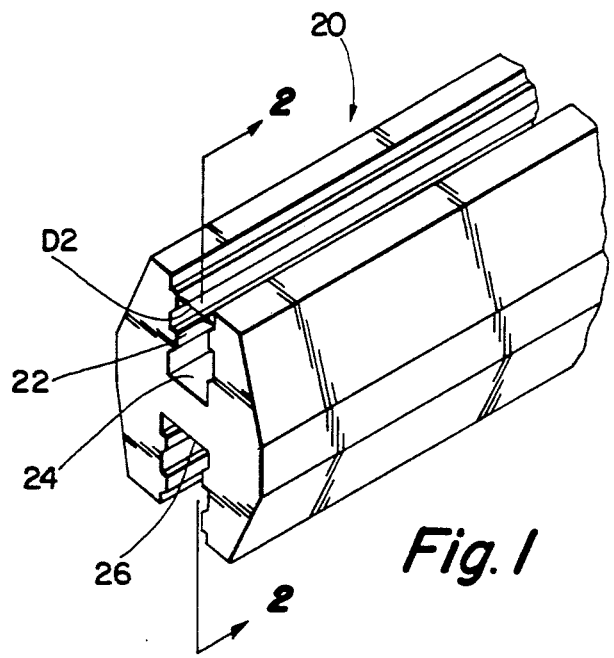
FIG. 1 is a perspective view, broken away, of one form of connector of the invention.
Figure 2:
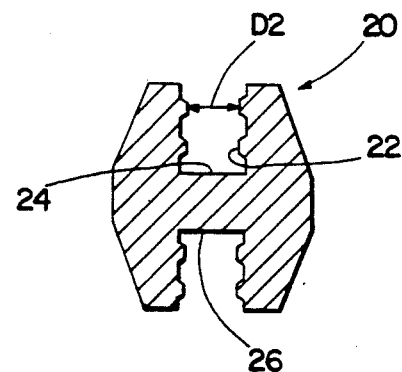
FIG. 2 is a cross section of the connector of FIG. 1 along the line 2—2.

In accordance with the invention, one embodiment of connector 20 that finds use in the method of joining one or more structural members is shown by FIGS. 1 and 2. The longitudinally extending connector 20, which is configured in a generally H-shaped cross section with its major dimension extending in the longitudinal direction, is preferably formed from a memory metal alloy such as nickel-titanium. This and other memory metal alloys are available from several U.S. suppliers including Shape Memory Applications, Inc., Sunnyvale, Calif.

Shape Memory Applications' literature states: "Memory Alloys undergo a transformation in their crystal structure when cooled from the stronger high temperature form (Austenite) to the weaker, low temperature form (Martensite). The martensite is easily deformed to a new shape. When the alloy is heated through its transformation temperature, it reverts to austenite and goes back to its previous shape with great force. This process is repeatable."

"The temperature at which the alloy 'remembers' its high temperature form when heated can be adjusted by slight changes in alloy composition. In the Nickel-Titanium alloys for instance, it can be changed from above +100° C. to below −100° C. The shape recovery occurs over just a few degrees and can be controlled within a degree or two."

Both austenite and martensite forms of the memory alloy are ductile with tensile strengths to 200,000 pounds per square inch (psi), are bio-compatible, and are extremely corrosion resistant. These memory alloys have a yield strength in the austenite form of from 35,000 to 70,000 psi; and, in the martensite form, a deformation stress of from 10,000 to 20,000 psi. The martensite form can absorb up to eight percent (8%) recoverable strain.

The connector 20 of FIG. 1 is formed from a memory metal alloy, such as that described, in its austenite form or phase. Lands 22 formed in opposing walls of respective gripping channels 24 and 26 are spaced-apart by a distance D1. This manufactured connector is then expanded (deformed) to its martensite phase so that the opposing lands are spaced-apart by a distance D2 as shown by FIG. 2, where D1 is less than D2 (D1<D2). The gripping channels 24 and 26 of the connector 20 remain substantially constant in configuration and dimensions in each of these alloy phases.

Figure 3:
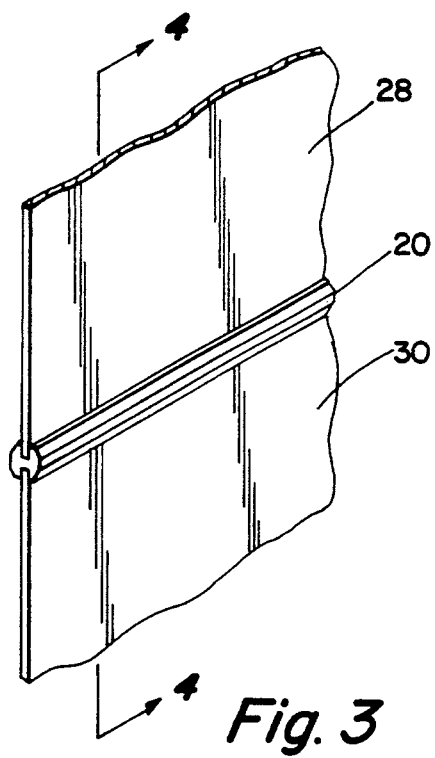
FIG. 3 is a perspective view of the connector of FIG. 1 in an assembly of structural members.
Figure 4:
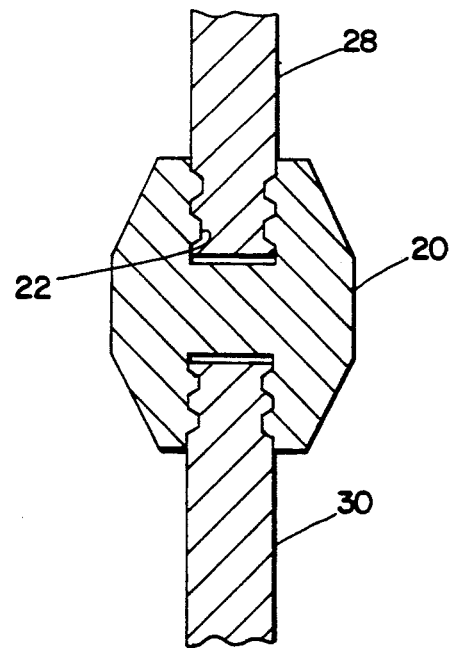
FIG. 4 is an enlarged, cross section of the connector region of FIG. 3 along the line 4—4.

In FIGS. 3 and 4, one or more structural members, such as flat plates 28 and 30, are positioned in the respective gripping channels 24 and 26 of connector 20 as described and shown by FIG. 2. The flat plates can be of similar materials; however, for purposes of describing the embodiment of FIGS. 1 through 5 and its use of dissimilar materials as structural members, plate 28 can be aluminum and plate 30 can be steel. Both plates have a dimensional thickness (T1) greater than the distance D1 but less than distance D2. With the plates 28 and 30 in position, the connector 20 is heated which results in a phase transformation from the martensite phase of FIG. 2 back to the austenite phase of FIG. 1. As the connector 20 undergoes this transformation and attempts to return to the austenite phase dimensions as described and shown by FIG. 1, the connector 20 grips the plates 28 and 30 under relatively strong compressive forces developed between the pairs of opposing lands 22. The connector 20 rigidly clamps the plates as shown by FIG. 4 into a final joint having excellent structural integrity.

Figure 5:
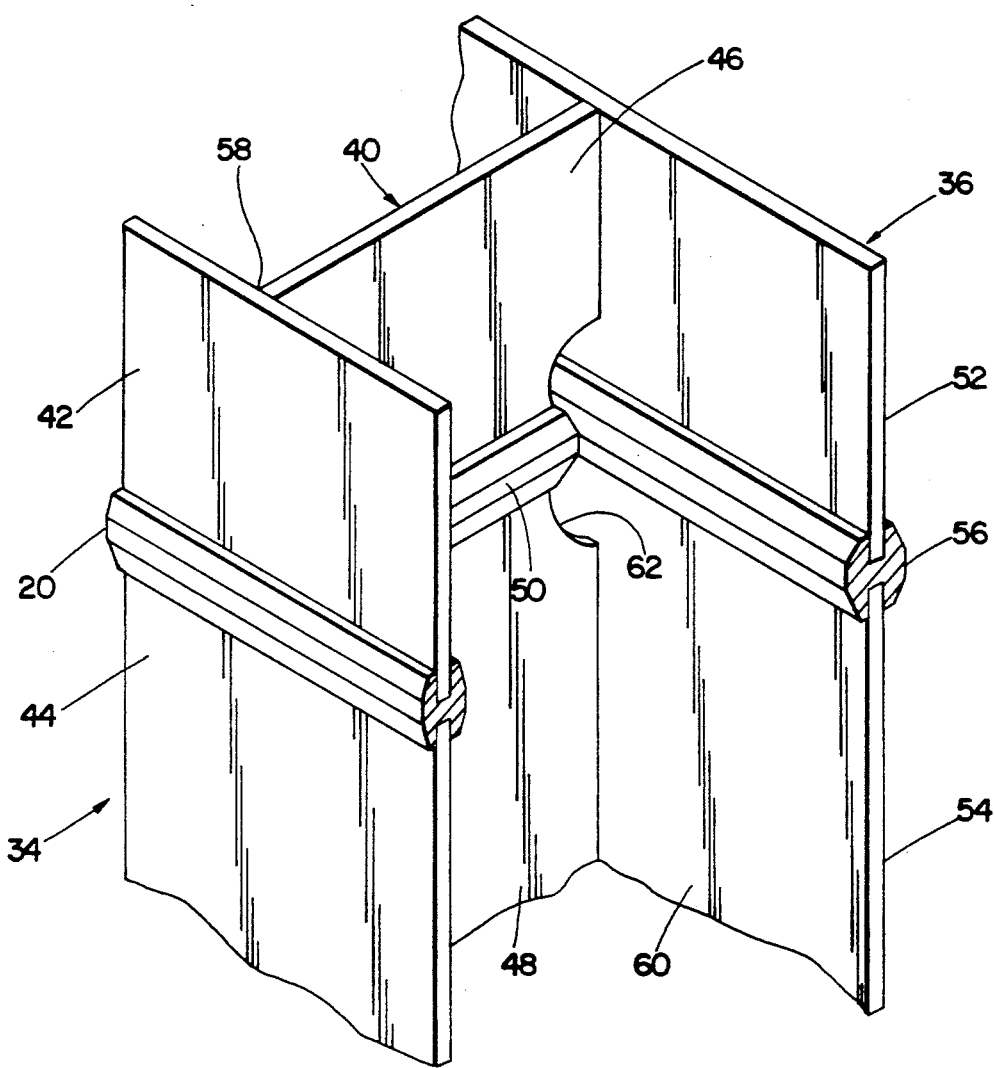
FIG. 5 is a perspective view, partly broken away, of an assembly of structural members and the connector of FIG. 1.

FIG. 5 illustrates an assembly of structural members and connectors such as connector 20, formed in accordance with the invention. The assembly includes a T-beam member 34 that butts into and is joined by conventional welds to a panel member 36. The T-beam member is formed from a flange panel 38 and a stem panel 40.

The flange panel 38 is a composite subassembly built-up from a pair of structural plates 42 and 44 that are joined by connector 20. The stem panel 40 is also a subassembly of a pair of structural plates 46 and 48 joined by connector 50. The panel member 36 is another subassembly that has a pair of structural plates 52 and 54 joined by connector 56. Connectors 50 and 56 are functionally like connector 20 although each need not be of the same physical dimensions or structural configuration; for example, other connector embodiments formed in accordance with the invention as will be described could be used where structurally applicable and desirable.

The T-beam member 34 of FIG. 5 is assembled by joining, e.g., welding, stem panel 40 to flange panel 38 along T-joint 58 where plates 46 and 48 butt into plates 42 and 44. The stem panel 40 of the T-beam member 34 is similarly joined to the panel member 36 along T-joint 60 where plates 46 and 48 butt into plates 52 and 54. A suitable cut-out, such as cut-out 62, can be used at each end of connector 50 so that the connector does not physically interfere with connectors 20 and 56 at the respective T-joints. Alternatively, a portion of each connector can be machined away or otherwise removed to accept an abutting surface. The size of cut-out 62 relative to the large size of the final assembly results in minimal, if any, loss of structural rigidity. Yet this assembly, which is relatively common in ship construction, can be readily manufactured through use of the connectors and method of the invention thereby eliminating relatively difficult weld joints that need to be made along intricate weld lines, and frequently under severely constrained welding tip orientations.

Figure 6:
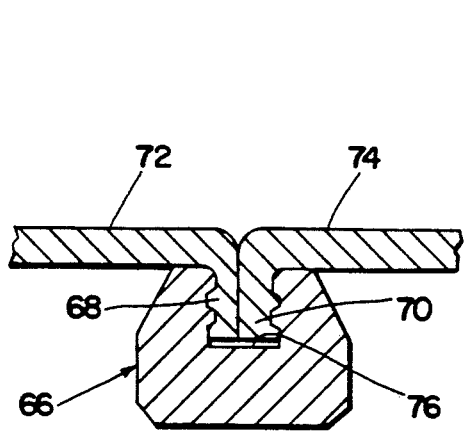
FIG. 6 is a cross section of another form of connector of the invention in an assembly of structural members.

In accordance with the invention, another embodiment of a connector 66 is shown by FIG. 6. Connector 66 is formed from a memory alloy and functions like connector 20 as described. Connector 66 is structurally distinguishable, however, from connector 20 since it is configured in a generally U-shaped cross section. Operatively, flange edges 68 and 70 of abutting plates 72 and 74, respectively, are clamped together in a connector channel 76 when the connector 66 under goes transformation to the austenite phase.

Figure 7:
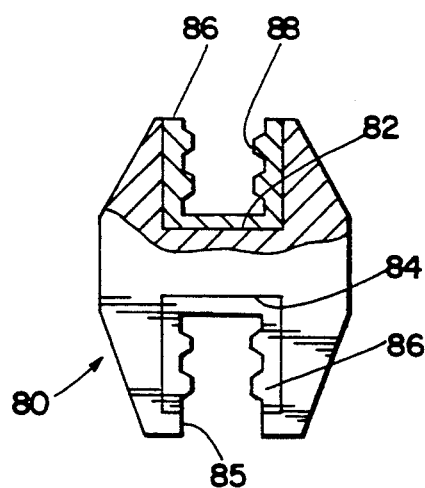
FIG. 7 is an end view, partly in cross section, of yet another form of connector of the invention.

Referring now to FIG. 7, yet another embodiment of a connector 80 can be formed from a memory alloy. The connector 80 has channels 82 and 84 that have smooth, opposing walls; that is, without lands such as the lands 22 of connector 20 as described. A liner 86 formed from a non-memory alloy is positioned within each of the channels 82 and 84. There are operating environments where the channel of a connector has a lip edge, such as lip edge 85 for channel 84, to retain the liner 86 within the channel. The liner 86 has internal gripping lands 88 similar to lands 22 of FIG. 1.

The use of liner 86 provides several advantages not readily available with the connectors of FIGS. 1–6 which have integrally formed landed channels. These advantages include:

1) A connector can be manufactured in standard sizes and used with various liner sizes, i.e., with various gap widths between the opposing lands but with common outer dimensions to compensate for different plate thicknesses to be retained by the connector.

2) The liner can be manufactured from a highly machinable material and could even be extruded.

3) Where structural members are formed from dissimilar materials, the selection of an appropriate liner material will further inhibit galvanic corrosion.

In accordance with another embodiment of the invention, a compressive connector assembly 90 as shown by FIG. 8 has a connector body 92 that is preferably formed from a metal or metal alloy which is not a memory metal alloy. However, it is contemplated that in certain applications of the connector assembly the connector body could be formed from a memory metal alloy where increased compressive or gripping forces are required.

The connector body 92 has one or more openings, such as longitudinally extending channel 94 which has inwardly tapering walls 96 and 98. The generally U-shaped channel 94, therefore, has a dimensional width at the bight 100 that is greater than the width at the mouth 102 as defined by the opposing walls 96 and 98.

Channel 94 is formed to receive a liner 104. Liner 104 has a gripping channel 106 with outer wall surfaces 108 and 110. These surfaces have a taper that is generally parallel with and complementary to the taper of the respective inner surfaces of walls 96 and 98. The liner 104 is also preferably formed from a metal or metal alloy which is not a memory metal alloy. However, like the liner 86 of FIG. 7, liner 104 has internal gripping lands 112 that are preferably positioned in opposing pairs as illustrated by FIG. 8. An actuator member 116 completes the compressive connector assembly 90.

The actuator 116 of FIG. 8 is formed from a memory metal alloy and preferably configured in a generally arc- or crescent-shaped cross section. The actuator is positioned between the bight surface 100 of channel 94 and the bottom surface 118 of liner 104. The dimension $D_T$ between the spaced-apart tips 120 and 122 of the actuator 116 is at a maximum in the martensite phase of the selected memory metal alloy.

Referring to FIG. 9, the compressive connector assembly 90 of FIGS. 8 and 9 is illustrated as it appears subsequent to a high temperature transformation from the martensite phase, as represented by FIG. 8, to the austenite phase. During the transformation, as has been described with reference to FIGS. 1 through 4, the actuator 116 attempts to return to its austenite dimensions; i.e., the dimension $D_T$ moves from a maximum toward its minimum dimension as measured between the tips 120 and 122. As the actuator tips move toward each other, the cross-sectional configuration of the actuator changes (compare the actuator 116 of FIG. 8 in its martensite phase to that of FIG. 9 subsequent to its austenite phase.) This tip movement generates a dislocating force between the bight surface 100 of channel 94 and the bottom surface 118 of liner 104 so that the liner is moved away from the bight surface toward the mouth 102 of the channel 94 and is, therefore, placed in compression. Thus, as the liner moves, the tapering inner surfaces of the channel walls 96 and 98 complement with the liner outer wall surfaces 108 and 110 to force the liner walls to move toward each other. This compressive force moves the opposing lands 112 of gripping channel 106 towards each other so that they clamp or grip an edge portion of a structural member, such as plate 126, positioned within the gripping channel. These relatively strong compressive forces are developed as a result of the actuator 116 functioning as a force generator.

The compressive connector assembly 90 of FIGS. 8 and 9 can be joined to a structural member, such as plate 128; for example, by a conventional welded joint 130. Although the plates 126 and 128, which are connected by the connector assembly 90, can be of similar materials, the plates can be formed of dissimilar metals so that, for example, one plate can be steel and the other plate aluminum.

In accordance with yet another embodiment of the invention, a compressive connector assembly 134 as shown by FIG. 10 is structurally and functionally similar to the connector assembly 90 of FIGS. 8 and 9, but here the longitudinally extending connector body 136 is configured generally as an H-shaped cross section. A pair of longitudinally-extending, outwardly- opening, and Janus-positioned channels 140 and 142 contain respective liners 144 and 146. These liners receive and are configured, like the liner 104 of FIG. 8, to grip associated structural members such as plates 148 and 150. Again like the connector assembly 90 of FIG. 8, the plates 148 and 150 are clamped into the assembly by the forces generated by similar actuator members 154 and 156 as has been described for assembly 90. Again, the structural members can be formed of similar or dissimilar materials in accordance with the teachings of the invention.

In an assembly process, the connector formed in accordance with the invention as described and illustrated, has several distinct advantages:

1) Except when cryogenic alloys are used, no special equipment is required for the assembly.
2) Elevated temperatures which may degrade material characteristics and induce warping are not incurred during the assembly process.
3) Use of a special explosive-bonded dissimilar material is not required for joining plates of different or dissimilar materials.
4) Training requirements for the assembly process are minimal.
5) The assembly process is not labor intensive.
6) The quality of the final assembly is excellent and repeatable.

As will be evidenced from the foregoing description, certain aspects of the invention are not limited to the particular details of construction as illustrated, and it is contemplated that other modifications and applications will occur to those skilled in the art. It is, therefore, intended that the appended claims shall cover such modifications and applications that do not depart from the true spirit and scope of the invention.

We claim:

1. A compressive connector assembly comprising:
   a) a connector body,
   b) at least one receptacle in said body,
   c) a liner member positioned in said receptacle and moveable from a first non-gripping position to a second gripping position,
   d) said liner member having a compressive channel with opposing walls spaced-apart a distance D1 in said second gripping position subsequent to a high temperature excursion and by a distance D2 in said first non-gripping position at the low temperature gradients where D1<D2,
   e) complementary tapers formed by opposing and spaced-apart inner surfaces of said receptacle and by outwardly facing outer surfaces of said liner member where the distance between said tapers decreases dimensionally from and between said first non-gripping position and said second gripping position, said opposing inner surfaces interconnected by a bight inner surface of said receptacle, and
   f) actuator means formed from a PRIOR ART material that has a shape memory which undergoes a transformation both in crystal structure and thereby in critical dimensions when the material is exposed to selected high temperature excursions and to low temperature gradients, and juxtaposed between said bight inner surface and said liner member,
   g) said actuator means developing an applied force during a selected high temperature excursion to move said liner member from and between said first non-gripping position and said second gripping position so that a structural member having a thickness T1 positioned partially within said liner member channel prior to said high temperature excursion is retained by said liner member when D1<T1<D2 thereby joining said structural member to said connector body.

2. The compressive connector assembly of claim 1 in which at least a pair of said receptacles are positioned in a back-to-back, outwardly opening relationship so that said connector body primarily defines an H-shaped cross section.

3. The compressive connector assembly of claim 1 in which said connector body has a plurality of receptacles where each of said receptacles retains an associated liner member and where said distances D1 and D2 as measured between the opposing walls of selected ones of said liner members have differing values so that associated ones of the structural members with differing T1 values are retained.

4. The compressive connector assembly of claim 3 in which the distance as measured between said opposing and spaced-apart inner surfaces of each of said receptacles has a constant value.

5. The compressive connector assembly of claim 1 in which selected ones of said actuator means are formed from a respective shape memory material having an associated phase change from martensite to austenite at differing high temperature excursions.

6. The compressive connector assembly of claim 1 in which said connector body has a major dimension that extends in a generally longitudinal direction and said receptacle also extends in said longitudinal direction.

7. The compressive connector assembly of claim 6 in which said connector body has at least a pair of receptacles that are Janus-positioned, and outwardly extending.

8. The compressive connector assembly of claim 1 in which said actuator means is a longitudinally extending actuator member having a crescent-shaped cross section including:
   a) a back portion positioned against said bight inner surface, and
   b) a pair of spaced-apart edge portions positioned against said liner member where a distance as measured between said spaced-apart edge portions at said first non-gripping position is greater than the distance at said second gripping position.

9. The compressive connector assembly of claim 8 in which said distance at said first non-gripping position is developed by said actuator member is in a martensite phase of the selected material having the shape memory characteristic.

10. The compressive connector assembly of claim 1 in which said connector body is formed from a PRIOR ART material that has a shape memory which undergoes a transformation both in crystal structure and thereby in critical dimensions when the material is exposed to selected high temperature excursions and to low temperature gradients.

11. A compressive connector assembly comprising:
   a) a connector body,
   b) plurality of receptacles in said body,
   c) a liner member positioned in and retained by selected ones of said receptacles, each of said liner members adapted to receive a structural member and formed from a shape memory material that undergoes a phase transformation between martensite and austenite at differing temperature excursions,
   d) a compressive channel in said liner member having opposing walls spaced-apart a distance D1 subsequent to a first temperature excursion and by a distance D2 as the result of a second temperature excursion where said first and second temperature excursions differ, where $D1<D2$ and where said distances D1 and D2 as measured between said opposing walls of selected ones of said liner members can have differing values so that a respective structural member having a thickness T1 positioned partially within a respective one of said channels prior to a repeat of said first temperature excursion is retained by said liner member when $D1<T1<D2$ thereby joining said structural member to said connector body.

12. The compressive connector assembly of claim 11 ion which said connector body has a major dimension that extends in a generally longitudinal direction and said receptacle also extends in said longitudinal direction.

13. The compressive connector assembly of claim 11 in which said first temperature excursion is at a temperature gradient relatively higher than said second temperature excursion.

* * * * *